United States Patent [19]
Moehlenpah

[11] 3,951,033
[45] Apr. 20, 1976

[54] CONNECTOR PLATE

[76] Inventor: Walter George Moehlenpah, 9906 Old Warson Road, St. Louis, Mo. 63124

[22] Filed: Jan. 16, 1975

[21] Appl. No.: 541,606

[52] U.S. Cl. ............................................. 85/13
[51] Int. Cl.² ...................................... F16B 15/00
[58] Field of Search .......... 85/13; 52/753 L, DIG. 6

[56] References Cited
UNITED STATES PATENTS

| | | | |
|---|---|---|---|
| 3,347,126 | 10/1967 | Templin et al. | 85/13 |
| 3,417,652 | 12/1968 | Menge | 85/13 |
| 3,479,920 | 11/1969 | Sanford | 85/13 |
| 3,633,454 | 1/1972 | Schmitt | 85/13 |
| 3,703,304 | 11/1972 | Losee | 85/13 |

FOREIGN PATENTS OR APPLICATIONS

| | | | |
|---|---|---|---|
| 1,090,373 | 11/1967 | United Kingdom | 85/13 |

Primary Examiner—Ramon S. Britts
Attorney, Agent, or Firm—Koenig, Senniger, Powers and Leavitt

[57] ABSTRACT

A connector or nailing plate having a plurality of openings arranged in columns extending lengthwise of the plate, the openings in each column being spaced at equal intervals and the columns being spaced at equal intervals transversely of the plate. Each opening has a tooth struck from each end thereof with the lateral planes of the teeth of certain openings being skewed relative to the longitudinal axis of their respective columns at a first skew angle and with the lateral planes of the teeth for certain other openings being skewed at a second skew angle substantially equal in magnitude but opposite in direction to the first skew angle.

11 Claims, 6 Drawing Figures

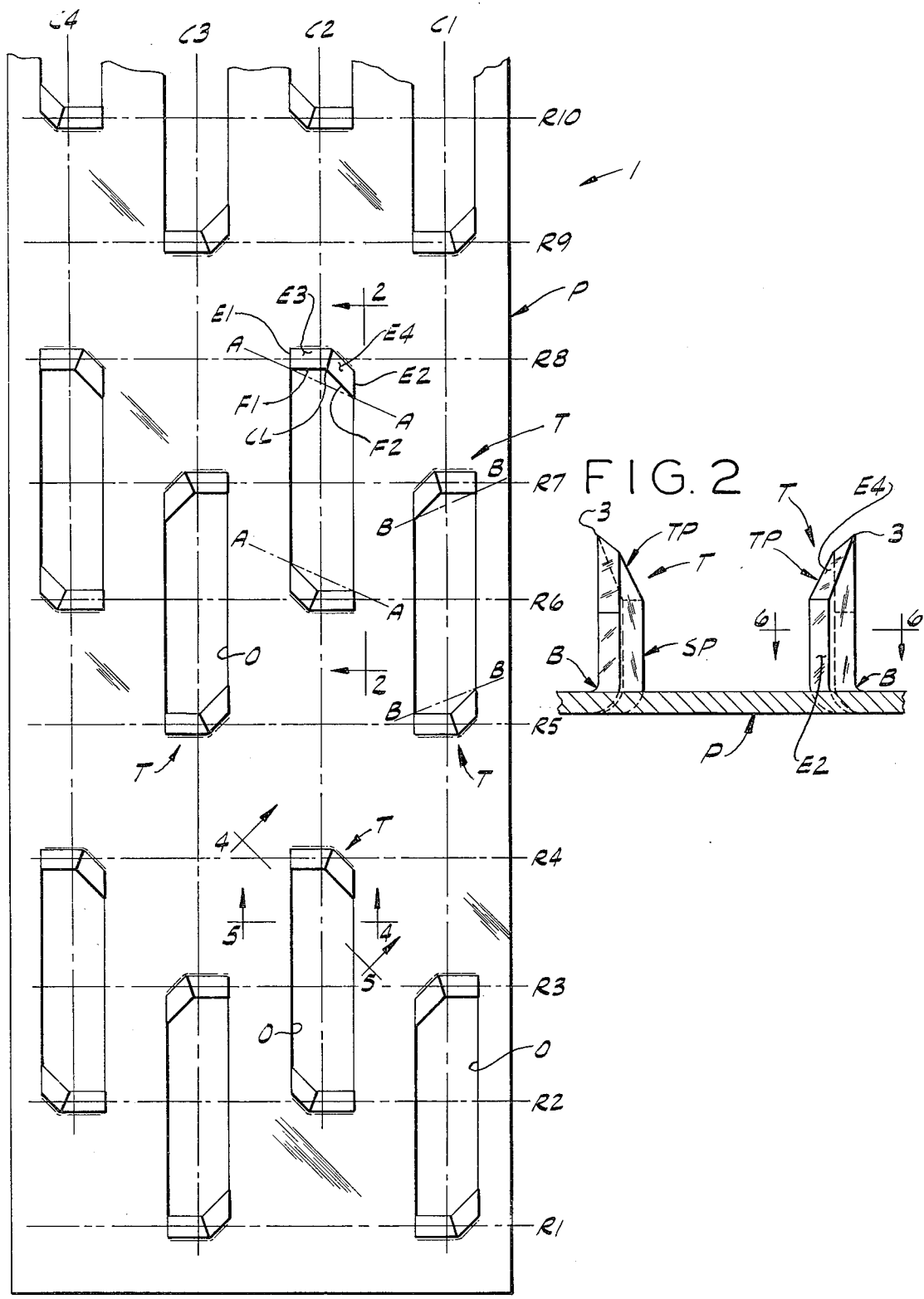

CONNECTOR PLATE

BACKGROUND OF THE INVENTION

This invention relates to connector or nailing plates, and more particularly to connector plates having a plurality of teeth projecting therefrom for securing together adjacent wood members to form a wood structure (e.g., for securing together the web and chord members of a roof or floor truss).

The teeth of the connector plate must be sufficiently strong to withstand forces necessary to drive or force them into the wood without bending over or buckling. When the teeth are imbedded in the wood, the connector plate must be sufficiently strong to hold adjacent wood members securely together so as to withstand the substantial tension, compression, shear and/or torsion loads to which the joint is subjected during fabrication of the structure, transportation of the wood structure to the building site and erection of the building (these fabrication, transportation and erection loads being generally referred to as handling loads), and during the life of the building with an adequate margin of safety to accommodate overload conditions.

Conventionally, connector plates are pressed into the wood members either by a powerful fluid-operated press (e.g., a C-shaped hydraulic press or the like) or by a gantry roller press. It is generally believed that pressing the connector plates into the wood members with a hydraulic press results in superior joints because only perpendicular forces are applied to the connector plate and to the wood members by the press. Thus, the plates are cleanly driven into the wood members and the wood members remain in their desired positions relative to one another during the pressing operation. By using a large gantry roller press to drive the connector plates into the wood members, a plurality of connector plates may be at least partially driven into the wood members during each pass of the gantry roller press thus facilitating increased production rates. However, as the roller press contacts and moves across each connector plate, the plate may tend to conform to the roller surface. That is, the plate may tend to curl or curve upwardly, particularly at the end thereof in advance of the roller and substantial lateral forces may be applied to the teeth of the connector plate and to the wood members by the roller. Thus, as the teeth are unevenly forced into the wood members by the roller press, the teeth may be inclined somewhat from the vertical so that the teeth may be bent flat or the wood members may be excessively torn or split. Such bending of the teeth may significantly weaken the joint and may not readily be found upon visual inspection of the joint. Reference may be made to U.S. Pat. No. 3,479,920 which shows a connector plate especially designed for use with gantry roller presses.

More generally, the strength of the connector plate (referred to as the plate rating) is conventionally evaluated by determining the ability of the connector plate teeth to resist withdrawal from the wood member and to resist movement through the wood member when two wood members joined together in end-to-end abutting relation by the connector plates are subjected to axial tension loading. However, in practice, connector plates joining the web and chord members of a truss may have loads other than axial tension loads applied thereto. These nonaxial loads may tend to cause the plate to rotate relative to the wood members or to tear or split the wood members thus weakening the joint. Most often the strength and load-holding capacity of the tooth is greatest when the face of the tooth is at right angles to the load. Thus conventional plates have a high load-holding capacity when the load is applied in one direction (e.g., along a line perpendicular to the lateral plane of the teeth of the connector), but may have a substantially lower load-holding capacity when the load is applied in another direction (e.g., along a line substantially parallel to the lateral plane of the teeth). If the load is applied parallel to the lateral plane of the teeth, the teeth present a relatively narrow edge or area to the load and the wood in contact with the narrow edges or faces of the teeth may be subjected to such high loading per unit area that the wood may fail.

Reference may be made to such U.S. Pat. Nos. as 3,347,126 and 3,633,454 and to the above mentioned U.S. Pat. No. 3,479,920 which disclose connector plates broadly similar to the connector plate of the present invention.

SUMMARY OF THE INVENTION

Among the several objects of the present invention may be noted the provision of a connector or nailing plate which may readily be imbedded in wood members either by a fluid operated press or by a gantry roller press; the provision of such a connector plate which readily penetrates commercially available lumber without bending of the teeth; the provision of such a connector plate which resists rotation relative to the wood members when subjected to axial, nonaxial, and torsional loading; the provision of such a connector plate in which its teeth present a relatively more uniform area to the wood when nonaxial loads are applied to the wood members; the provision of such a connector plate having teeth with high resistance to withdrawal from the wood; and the provision of such a connector plate which may be readily and economically fabricated on conventional equipment. Other objects and features of this invention will be in part apparent and in part pointed out hereinafter.

Briefly, a connector of this invention for securing together adjacent wood members of a wood structure comprises a plate of mild commercial steel or the like having a plurality of elongate openings arranged in columns extending longitudinally of the plate, each opening having elongate struck-out portions of the plate extending generally perpendicular to one face of the plate at each end of the opening, these struck-out portions constituting elongate teeth. The openings in each column are spaced at substantially equal intervals relative to one another in the direction of the column and the columns are spaced transversely across the plate at substantially equal intervals. Each tooth has a shank portion and a pointed tip portion terminating at the free end of the tooth and is generally channel-shaped in cross section with the side edges of the shank portion being substantially parallel. Teeth of certain openings are so oriented relative to the longitudinal axes of their respective columns that vertical planes tangent to portions of the teeth side edges toward their openings is skewed in one direction at a first predetermined angle with respect to the longitudinal axes of their respective columns. The teeth of certain other openings are so oriented relative to the longitudinal axes of their respective columns that vertical planes tangent to portions of the side edges of these latter teeth are skewed at a second predetermined angle substantially equal in magnitude but opposite in direction to the first predetermined angle. Each tooth is substantially a mirror image of the tooth at the opposite end of its opening and is skewed at the same angle.

BRIEF DESCRIPTION OF DRAWINGS.

FIG. 1 is an enlarged plan view of a connector plate of this invention;

FIG. 2 is a vertical section taken on line 2—2 of FIG. 1 illustrating a pair of teeth struck from a common opening in the plate, the teeth being mirror images of one another;

Corresponding reference characters indicate corresponding parts throughout the several views of the drawings.

DESCRIPTION OF A PREFERRED EMBODIMENT

Figure 3:
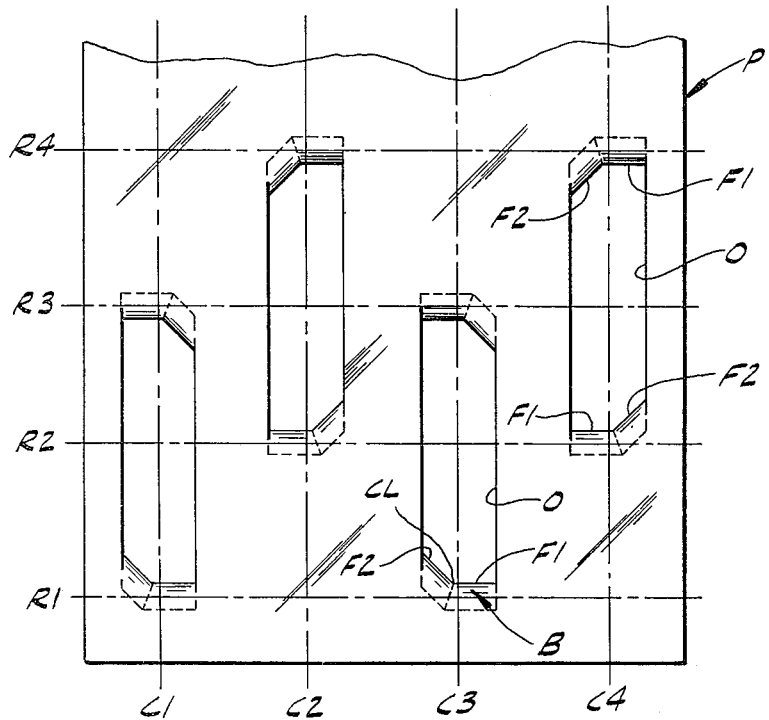
FIG. 3 is a bottom view of a portion of the connector plate of FIG. 1.

Referring now to the drawings, a connector of this invention, indicated in its entirety at 1, for securing together wood members of a wood structure (e.g., the chord and web members of a roof truss or a floor truss) is shown to comprise a plate P of commercial steel or the like. This plate may be of a variety of gauge thicknesses, depending on the strength required of the plate. For example, the thickness of the plate may range between 12 and 20 gauge material. Preferably, the plate is galvanized to resist corrosion.

The plate has a plurality of openings O therein arranged in columns C1, C2, C3... extending longitudinally of the plate. Each opening O has a struck-out portion of the plate extending generally perpendicular to one face of the plate at each end of the opening, these struck-out portions constituting teeth T. The openings O in each column C1, C2, C3... are spaced at substantially equal intervals relative to one another and thus form columns of teeth T. These columns of teeth are spaced transversely across the plate at substantially equal intervals. As best shown in FIG. 1, the openings O in each column are equally spaced from one another a distance corresponding to the length of opening O, and the openings of alternate columns are offset approximately one-half the length of an opening O with the teeth T of alternate columns, for example, C1 and C3, substantially aligned with one another in rows R1, R3, R5, etc. and with the teeth of columns C2 and C4 aligned in rows R2, R4, etc.

Figure 6:
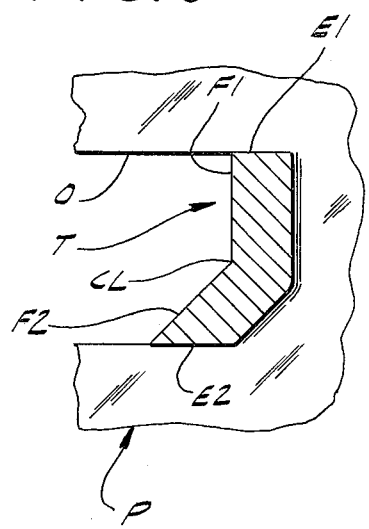
FIG. 6 is an enlarged horizontal cross section of a tooth of the connector plate of this invention taken along line 6—6 of FIG. 2.
Figure 4:
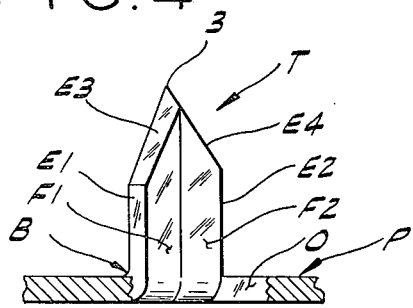
FIGS. 4 and 5 are views taken on lines 4—4 and 5—5, respectively, of FIG. 1 illustrating the true lengths of the vertical and certain horizontal dimensions of the tooth.
Figure 5:
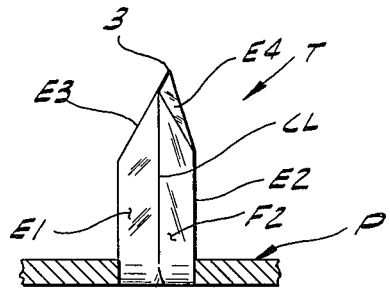

Each tooth has a shank portion SP, a pointed tip portion TP and a tip 3 at the free end of the tooth. As best shown in FIG. 6, each tooth T is channel-shaped (e.g., V-shaped) in cross section and is turned or skewed relative to the center line of its column of openings. More particularly, each tooth T includes a base B joining the tooth to plate P at one end of opening O. As shown in the drawings, teeth T are V-shaped in cross section with each tooth having inside faces F1 and F2 intersecting along a crimp line CL extending perpendicular to plate P. As best shown in FIG. 6, face F1 is generally perpendicular to the longitudinal axis of the column and face F2 is angled with respect to the column axis. The included angle between faces F1 and F2 is preferably about 135°. It will be understood, however, that this included angle may vary considerably. For example, the included angle may range between about 120° and 150°. By providing V-shaped teeth T (or teeth of other channel-shaped cross section) it will be understood that the moment of inertia of the tooth is thereby increased thus enabling the tooth to withstand higher compressive and bending forces than a plain straight tooth. As best shown in FIGS. 4 and 5, shank portion SP has edges E1 and E2 which are substantially parallel to one another with edge E1 being somewhat shorter than edge E2. In FIGS. 1 and 6, it will be noted that the distance from edge E1 to crimp line CL is substantially equal to the distance from edge E2 to the crimp line and that each of these distances is somewhat greater than half of the width of opening O. It will thus be noted that crimp lines CL of the teeth at each end of each opening are offset from the longitudinal center line of the column on opposite sides thereof.

As shown in FIGS. 4 and 5, the tip portion TP of each tooth T is unsymmetrical with respect to its crimp line CL and the point 3 of each tooth is offset from the longitudinal axis of the column and is closest to edge E2 of the tooth. Tip portion TP is defined by inwardly tapering edges E3 and E4 extending upwardly and inwardly from the upper ends of edges E1 and E2, respectively. Edges E3 and E4 intersect to form tip 3 of the tooth. It will be noted that edge E3 is somewhat longer than edge E4.

As previously mentioned, each tooth T may be thought of as being skewed or rotated with respect to the longitudinal axis of its respective opening O. More specifically, the teeth of certain openings (e.g., the openings in columns C2 and C4) are shown to be oriented relative to the longitudinal axes of their respective columns with vertical planes for the teeth, as indicated at A—A in FIG. 1, tangent to the portions of teeth side edges E1 and E2 toward their openings skewed in one direction at a first predetermined skew angle. The teeth of other certain openings (e.g., the openings in columns C1 and C3) are so oriented relative to the longitudinal axes of their respective columns that other vertical planes, as indicated at B—B, tangent to side edges E1 and E2 of these other teeth are skewed at a second skew angle substantially equal in magnitude, but opposite in direction to the first skew angle. Each tooth is substantially a mirror image of the tooth at the other end of its respective opening so that both teeth projecting from opposite ends of each opening are skewed at the same angle. Thus, the teeth of alternate openings (e.g., the teeth of the openings in any row R1, R2, etc.) are skewed in the same direction and the teeth of adjacent openings (e.g., the teeth of the openings in adjacent columns) are skewed in opposite directions. Stated in another manner and as illustrated in FIG. 1, the teeth in each column are shown to be skewed at the same skew angle and the teeth of adjacent columns are skewed in the opposite direction with substantially half the teeth of connector 1 skewed in one direction and the other half of the teeth skewed in opposite direction.

With teeth T being generally V-shaped in cross section, as described above, the teeth are sufficiently strong to resist being bent over as they are driven into the wood members either by a fluid-operated press or by a gantry roller press. Thus, teeth T have sufficient stiffness to penetrate the most dense commercially available pine, fir, hemlock or other lumber used in the building industry and have sufficient resistance to bending so as to resist being bent over by the lateral loads imposed on the teeth as they are pressed into the wood members by a gantry roller press.

Also, with teeth T of connector 1 arranged in columns and rows and oriented "(or skewed)" as above described, the connector of this invention is best able to accommodate axial, nonaxial and torsion loading of the wood structure. More particularly, with the teeth of adjacent columns oriented in opposite directions, the teeth present a relatively uniform area to the wood members regardless of the direction from which the load applied to the connector via the wood members. This makes the load-holding capacity of the plate more uniform when both axial and nonaxial loads are applied. It will be noted that if a nonaxial load is applied parallel to the lateral plane of half of the teeth (i.e., parallel to the lateral plane B—B of the teeth in columns C1 and C3) that the teeth in the alternate columns (i.e., the teeth in columns C2 and C4) present a relatively large area to the wood thereby to substantially prevent high unit area stresses from being applied to the wood and thus preventing ripping or tearing of the wood fibers.

It will be understood that teeth T in openings O are formed by a punch and die and that the cuts defining the edges E3 and E4 of the tip portion TP of the tooth are so-called "air cuts" (i.e., these cuts are formed on initial contact of the punch with the plate without a die backing the plate in the area of this initial cut). Thus, the resulting shape of tooth T may vary somewhat from the drawings shown in FIGS. 1–6 and the resulting plate will still be within the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector for securing together adjacent wood members of a wood structure comprising a plate of mild commercial steel or the like having a plurality of elongate openings arranged in columns extending longitudinally of the plate, each said opening having elongate struck-out portions of the plate extending generally perpendicular to one face of the plate at each end of the opening, the struck-out portions constituting elongate teeth, said openings in each said column being spaced at substantially equal intervals relative to one another in the direction of the column and said columns being spaced transversely across the plate at substantially equal intervals, each said tooth having a shank portion and a pointed tip portion terminating at the free end of the tooth and being generally channel-shaped in cross section with the side edges of the shank portion being substantially parallel, both teeth of certain openings being so oriented relative to the longitudinal axes of their respective columns that vertical planes tangent to portions of said teeth side edges toward said certain openings are skewed in one direction at a first predetermined angle with respect to said longitudinal axes of their respective columns and both of the teeth of certain others of said openings being so oriented relative to the longitudinal axes of their respective columns that vertical planes tangent to portions of the side edges of these latter teeth are skewed at a second predetermined angle substantially equal in magnitude but opposite in direction to said first predetermined angle, each said tooth being substantially a mirror image of the tooth at the opposite end of its respective opening with both teeth in one opening being skewed at the same angle and in the same direction.

2. A connector as set forth in claim 1 wherein teeth of alternate openings are skewed in said one direction and teeth of the other openings are skewed in said opposite direction.

3. A connector as set forth in claim 2 wherein the teeth in one column are skewed in said one direction and the teeth in an adjacent column are skewed in said opposite direction.

4. A connector as set forth in claim 3 wherein said openings in each column are spaced longitudinally from one another approximately the length of one of said openings.

5. A connector as set forth in claim 1 wherein corresponding openings of alternate columns are substantially aligned with one another transversely of the plate and are longitudinally offset from openings in the adjacent columns with the teeth in each column of openings constituting a column of teeth and with the teeth of corresponding openings of alternate columns constituting rows of teeth extending transversely across the plate.

6. A connector as set forth in claim 3 wherein the shank portion of each tooth is generally V-shaped in cross section with the inside faces of the tooth intersecting along a line extending generally perpendicular to said one face of the plate.

7. A connector as set forth in claim 6 wherein the included angle between the intersecting inside faces of each said V-shaped tooth ranges between about 120° and 150°.

8. A connector as set forth in claim 7 wherein one of said intersecting inside faces is substantially perpendicular to the longitudinal axis of its respective column of openings.

9. A connector as set forth in claim 8 wherein said included angle is approximately 135°.

10. A connector as set forth in claim 9 wherein said tip portion of each tooth terminates at a point, said point being offset from said longitudinal axis of its column of openings.

11. A connector as set forth in claim 10 wherein said line for each tooth is offset from the longitudinal axis of its respective column of openings.

* * * * *

UNITED STATES PATENT AND TRADEMARK OFFICE
CERTIFICATE OF CORRECTION

PATENT NO. : 3,951,033
DATED : April 20, 1976
INVENTOR(S) : Walter George Moehlenpah It is certified that error appears in the above-identified patent and that said Letters Patent are hereby corrected as shown below:

Column 3, lines 2 and 3, "substantially a mirror image" should read --a substantial duplicate-- ; line 10, "mirror images" should read --substantial duplicates--. Column 4, line 48, "substantially a mirror image" should read --a substantial duplicate--. Column 6, lines 13 and 14, "substantially a mirror image" should read --a substantial duplicate--.

Signed and Sealed this sixteenth Day of August 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : B1 3,951,033

DATED : July 7, 1987

INVENTOR(S) : Walter G. Moehlenpah

It is certified that error appears in the above—identified patent and that said Letters Patent is hereby corrected as shown below:

[73] Assignee: "Moehlenpah Industries, Inc., Coeur, Md." should read -- Moehlenpah Industries, Inc., Creve Coeur, MO. --.

Signed and Sealed this

Ninth Day of August, 1988

*Attest:*

DONALD J. QUIGG

*Attesting Officer*   *Commissioner of Patents and Trademarks*

REEXAMINATION CERTIFICATE (713th)
United States Patent [19]
Moehlenpah

[11] B1 3,951,033
[45] Certificate Issued Jul. 7, 1987

[54] CONNECTOR PLATE

[75] Inventor: Walter G. Moehlenpah, St. Louis, Mo.

[73] Assignee: Moehlenpah Industries, Inc., Coeur, Md.

Reexamination Request:
No. 90/000,818, Jul. 8, 1985

Reexamination Certificate for:
Patent No.: 3,951,033
Issued: Apr. 20, 1976
Appl. No.: 541,606
Filed: Jan. 16, 1975

Certificate of Correction issued Aug. 16, 1977.

[51] Int. Cl.⁴ .............................................. F16B 15/00
[52] U.S. Cl. ...................................... 411/468; 411/921
[58] Field of Search ............................ 411/461-468; 52/DIG. 6; 403/283

[56] References Cited
U.S. PATENT DOCUMENTS

| | | | |
|---|---|---|---|
| 3,052,149 | 9/1962 | West | 411/467 |
| 3,094,748 | 6/1963 | Sanford . | |
| 3,104,429 | 9/1963 | Sanford . | |
| 3,347,126 | 10/1967 | Templin et al. | 411/463 |
| 3,417,652 | 12/1968 | Menge | 411/466 |
| 3,479,920 | 11/1969 | Sanford | 411/468 |
| 3,603,197 | 9/1971 | Wood | 411/468 |
| 3,633,454 | 1/1972 | Schmitt et al. | 411/468 |
| 3,703,304 | 11/1972 | Losee | 411/462 |
| 3,731,583 | 5/1973 | Jureit | 411/466 |
| 3,892,160 | 7/1975 | Jureit et al. | 411/468 |

FOREIGN PATENT DOCUMENTS

| | | | |
|---|---|---|---|
| 1090373 | 11/1967 | United Kingdom | 411/466 |
| 1281801 | 7/1972 | United Kingdom | 411/466 |

*Primary Examiner*—Robert L. Wolfe

[57] ABSTRACT

A connector or nailing plate having a plurality of openings arranged in columns extending lengthwise of the plate, the openings in each column being spaced at equal intervals and the columns being spaced at equal intervals transversely of the plate. Each opening has a tooth struck from each end thereof with the lateral planes of the teeth of certain openings being skewed relative to the longitudinal axis of their respective columns at a first skew angle and with the lateral planes of the teeth for certain other openings being skewed at a second skew angle substantially equal in magnitude but opposite in direction to the first skew angle.

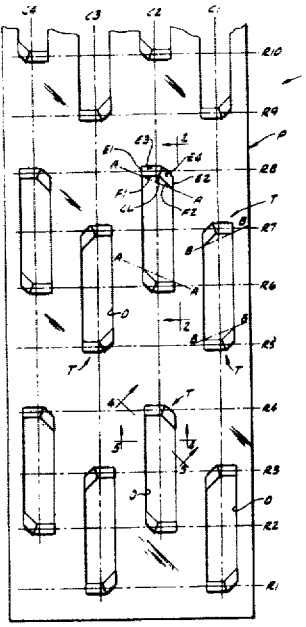

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

New claim 12 is added and determined to be patentable.

12. A connector for securing together adjacent wood members of a wood structure comprising a plate of mild commercial steel or the like having a plurality of elongate openings arranged in columns extending longitudinally of the plate, each said opening having elongate struck-out portions of the plate extending generally perpendicular to one face of the plate at each end of the opening, the struck-out portions constituting elongate teeth, said openings in each said column being spaced at substantially equal intervals relative to one another in the direction of the column and said columns being spaced transversely across the plate at substantially equal intervals, each said tooth having a shank portion and a pointed tip portion terminating at the free end of the tooth and being generally channel-shaped in cross section with the side edges of the shank portion being substantially parallel, both teeth of certain openings being so oriented relative to the longitudinal axes of their respective columns that vertical planes tangent to portions of said teeth side edges toward said certain openings are skewed in one direction at a first predetermined angle with respect to said longitudinal axes of their respective columns and both of the teeth of certain others of said openings being so oriented relative to the longitudinal axes of their respective columns that vertical planes tangent to portions of the side edges of these latter teeth are skewed at a second predetermined angle substantially equal in magnitude but opposite in direction to said first predetermined angle, each said tooth being a substantial duplicate of the tooth at the opposite end of its respective opening with both teeth in one opening being skewed at the same angle and in the same direction, said plate being a flat generally rectangular plate and the longitudinal axes of said elongate openings being generally aligned with longitudinal axes of said columns, said teeth being skewed substantially along their entire lengths with respect to the longitudinal axes of their respective openings.

* * * * *